US009015818B2

(12) United States Patent
Paliwal

(10) Patent No.: US 9,015,818 B2
(45) Date of Patent: Apr. 21, 2015

(54) SOFTWARE APPLICATION OPERATIONAL TRANSFER

(75) Inventor: Rohit Paliwal, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1409 days.

(21) Appl. No.: 12/533,785

(22) Filed: Jul. 31, 2009

(65) Prior Publication Data

US 2013/0167242 A1 Jun. 27, 2013

(51) Int. Cl.
 G06F 7/04 (2006.01)
 G06F 15/16 (2006.01)
 G06F 17/30 (2006.01)
 H04L 29/06 (2006.01)
 G06F 21/12 (2013.01)
 G06F 21/10 (2013.01)

(52) U.S. Cl.
 CPC .............. *G06F 21/12* (2013.01); *G06F 21/105* (2013.01)

(58) Field of Classification Search
 CPC ..... G06F 21/10; G06F 21/105; G06F 21/121; G06F 21/12; H04L 63/10
 USPC ........................ 705/59; 726/22, 26–31, 2–4, 7
 See application file for complete search history.

(56) References Cited

U.S. PATENT DOCUMENTS

| 5,742,757 | A | * | 4/1998 | Hamadani et al. | 726/32 |
|---|---|---|---|---|---|
| 5,790,664 | A | * | 8/1998 | Coley et al. | 709/203 |
| 6,915,278 | B1 | * | 7/2005 | Ferrante et al. | 705/59 |
| 7,389,273 | B2 | * | 6/2008 | Irwin et al. | 705/59 |
| 7,421,466 | B2 | * | 9/2008 | Haines | 709/200 |
| 2005/0289072 | A1 | * | 12/2005 | Sabharwal | 705/59 |
| 2006/0106727 | A1 | * | 5/2006 | Yellai et al. | 705/59 |
| 2006/0287959 | A1 | * | 12/2006 | Blecken | 705/59 |

OTHER PUBLICATIONS

"Bluetooth", Jun. 24, 2009, http://en.wikipedia.org/wiki/Bluetooth, 21 pages.
"Floating License", Jun. 4, 2009, http://en.wikipedia.org/wiki/License_server, 1 page.
"Steam: The Nexus of PC Gaming", Jun. 24, 2009, http://store.steampowered.com/about/, 2 pages.
Dierks, T. et al., "The Transport Layer Security (TLS) Protocol", Version 1.1, Apr. 2006, The Internet Society, http://www.ietf.org/rfc/rfc4346.txt, 86 pages.

(Continued)

*Primary Examiner* — Saleh Najjar
*Assistant Examiner* — Feliciano Mejia
(74) *Attorney, Agent, or Firm* — Wolfe-SBMC

(57) ABSTRACT

Methods, systems, and apparatus, including computer programs encoded on a computer storage medium, enable software application transfer among connected computing devices. In one aspect, a method includes receiving a request, corresponding to an application running on a first computer, to operate the application on a second computer; initiating a communication session between the first computer and the second computer over a network; disabling the application on the first computer with respect to one or more operational parameters; and enabling the application on the second computer with respect to the one or more operational parameters. The one or more operational parameters can include a software licensing state of the application, current application data of the application running on the first computer, or both.

22 Claims, 4 Drawing Sheets

(56) References Cited

OTHER PUBLICATIONS

Haigh, Dominic, "Floating Licensing Old and New—an Overview", Jun. 24, 2009, http://knol.google.com/k/dominic-haigh/floating-licensing-old-and-new-an/2zijsseq . . . , 2 pages.

Rescorla, E. et al., "Datagram Transport Layer Security", Apr. 2006, The Internet Society, http://www.rfc-editor.org/rfc/rfc4347.txt, 25 pages.

* cited by examiner

SOFTWARE APPLICATION OPERATIONAL TRANSFER

BACKGROUND

This specification relates to software applications used on more than one computer.

Software applications that are distributed, either for free or for profit, are often accompanied by software licenses. Such licenses are digital permits containing descriptions of rights to use of the applications. Software licenses include single device licenses that limit the use of the software to a particular computer. Such licenses can be sold one at a time, or in bulk (e.g., seat licenses). Software licenses also include floating licenses, which are a pool of licenses that can be shared among multiple computers by contacting a license server that manages the pool. The conventional floating license model enables a software vendor to sell a software product based on a concurrent-user limit as an alternative to selling the product based on seat licenses. In addition, software applications sold directly to end users often employ Internet/Web based product action licensing schemes.

Many software applications also provide output file formats to allow one to save work done using the application to a system file on a computer. Such saved files can then be sent (e.g., emailed) to another computer to be opened there using the same application. In addition, there are some applications that employ server backing, where data retained by the application for later use is stored on a server computer via a network, so that this application data is accessible in the future when the same application is used on another device connected to the same server computer via a network.

SUMMARY

This specification describes technologies relating to transferring operation of a software application between different computers. This can include automatic or user initiated trusted peer-to-peer communication between two instances of an application running on different devices to transfer licensing and session data between the devices.

In general, one innovative aspect of the subject matter described in this specification can be embodied in methods that include the actions of receiving a request, corresponding to an application running on a first computer, to operate the application on a second computer; initiating a communication session between the first computer and the second computer over a network; disabling the application on the first computer with respect to one or more operational parameters; and enabling the application on the second computer with respect to the one or more operational parameters. The one or more operational parameters can include a software licensing state of the application, the disabling can include preventing licensed operation of the application on the first computer, and the enabling can include allowing licensed operation of the application on the second computer. The one or more operational parameters can include current application data of the application running on the first computer, the disabling can include closing the application running on the first computer, and the enabling can include transmitting the current application data over the network to the second computer for use in running the application on the second computer. Other embodiments of this aspect include corresponding systems, apparatus, and computer programs, configured to perform the actions of the methods, encoded on computer storage devices.

These and other embodiments can each optionally include one or more of the following features. Method operations can include checking for available computers from a predefined list of computers; and selecting the second computer from the available computers. The predefined list of computers can include a mobile computing device, a cell phone, a laptop computer, and a desktop computer. The network can include a wireless network of computers, the checking can include checking the wireless network of computers, and the selecting can include selecting the second computer based on physical positions of the available computers. Moreover, the selecting can include determining physical positions of the available computers; sorting a list of the available computers based on the physical positions of the available computers; outputting the sorted list for presentation; receiving input; and identifying one computer in the list to be the second computer based on the received input.

Method operations can include checking whether operation of the application on the second computer requires suspension of a license to run the application on the first computer; transferring licensing state information from the first computer to the second computer when operation of the application on the second computer requires suspension of the license to run the application on the first computer, where the transferring the licensing state information includes at least a portion of the disabling; checking whether the application running on the first computer has in-memory temporary data on the first computer; and transferring the in-memory temporary data from the first computer to the second computer when the application running on the first computer has the in-memory temporary data on the first computer, where the transferring the in-memory temporary data includes at least a portion of the enabling.

These and other embodiments can also be implemented in a system and/or using a computer storage medium encoded with a computer program, the program including instructions that when executed by data processing apparatus cause the data processing apparatus to perform method operations. A system implementation can include a user device; and one or more computers operable to interact with the device and to perform operations including: receiving a request, corresponding to an application running on a first computer, to operate the application on a second computer; initiating a communication session between the first computer and the second computer over a network; checking whether operation of the application on the second computer requires suspension of a license to run the application on the first computer; transferring licensing state information from the first computer to the second computer when operation of the application on the second computer requires suspension of the license to run the application on the first computer; checking whether the application running on the first computer has active application data on the first computer; and transferring the active application data from the first computer to the second computer when the application running on the first computer has the active application data on the first computer. The first computer and the second computer can each be one of a group of computers including a mobile computing device, a cell phone, a laptop computer, and a desktop computer. Moreover, the one or more computers can include the first computer, the user device can be a user interface device, and the first computer can include the user interface device.

Particular embodiments of the subject matter described in this specification can be implemented so as to realize one or more of the following advantages. State and session and license data (as applicable) can be transferred between instances of an application running on different devices, whether mobile devices, laptops, desktop computers, etc. This can happen automatically or upon a user initiated action, whether user-interface driven or gesture based, to provide a user a seamless session across various devices. A user can carry his license of an application between various devices as well as continue his application session, with no loss of productivity. Moreover, if the application is not running in the target device, it can be automatically launched to accept the license and session data in some implementations.

A user need not purchase multiple software licenses for an application, which the user uses on multiple computer platforms. For example, when purchasing a Sudoku application, rather than purchasing three licenses (one for the user's personal computer (PC), one for the user's laptop, and one for the user's mobile phone), the user need only buy one license that can then be transferred from one device to another. In addition, a user can seamlessly stop working on one device and continue on another device from where the user left off in the application. So, using the Sudoku example, if the user is in the middle of a game on his phone, he can transfer the game to his PC and finish the game there; the application data, e.g., session, score, ranking, etc., can also be transferred to the new device so the application is seamlessly shared among multiple devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
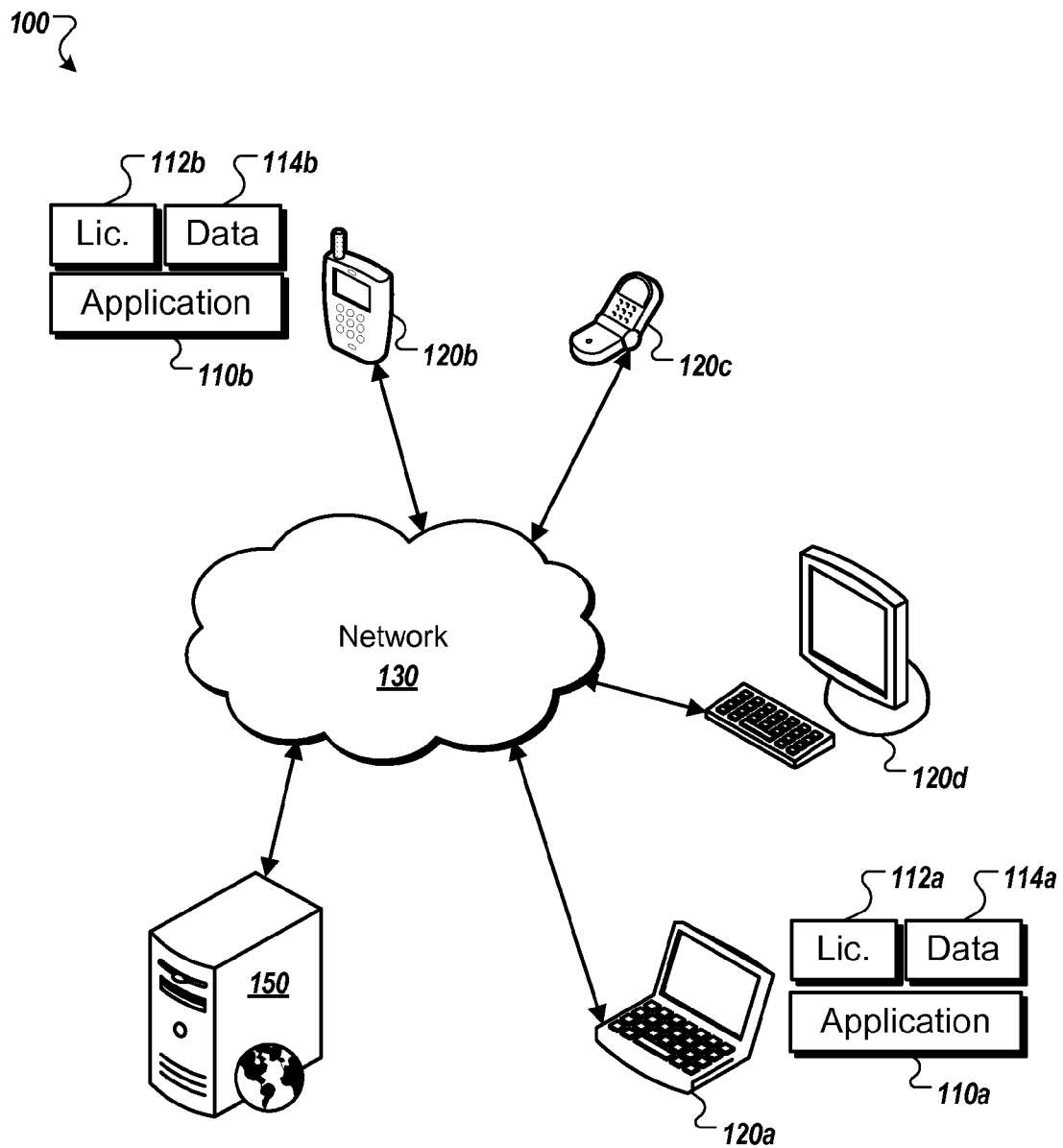
FIG. 1 is a block diagram showing an example of a system in which a software application is transferred between different computers.

FIG. 1 is a block diagram showing an example of a system 100 in which a software application 110 is transferred between different computers. The system 100 includes a network 130 and multiple computers 120, which can include a laptop 120a, a mobile wireless device 120b, a mobile phone 120c, a desktop computer 120d, etc. The network 130 can include a wireless network (e.g., cell phone network, a personal area network (e.g., a BLUETOOTH® connection), etc.), a land-based network (e.g., the Internet, a wide area network, a local area network (e.g., an Ethernet connection), etc.), or a combination of these. In addition, other computers can also be connected through the network 130. For example, one or more server computers 150 can provide services (e.g., Web services) over the network 130.

A user can operate the application 110 on a computer 120, such as the application instance 110a on the laptop 120a. The application 110 is any set of code that effects a discrete software tool on multiple computers 120, regardless of whether that software tool is a game or whether the set of code includes different programs written in different native languages for the different computer platforms. For example, the application 110 can be a game or utility (e.g., image editing, word processing, or spreadsheet software) written in one programming language for the laptop 120a, and written in another programming language for the mobile wireless device 120b, or the application 110 can be a utility or game (e.g., a Sudoku game) written in a computer language that operates within a runtime environment common to both the laptop 120a and the mobile wireless device 120b (e.g., ADOBE AIR® software provided by Adobe Systems Incorporated of San Jose, Calif.).

In any case, the user is working on something using the application instance 110a and then needs to move to another device (e.g., the user needs to leave quickly, without the laptop 120a, but wants to continue to play his Sudoku game). The system 100 can allow the user to do this smoothly, even when the application instance 110a includes a software license 112a that is not active on the mobile device 120b, and when the application instance 110a includes application data 114a that has not been (or possibly cannot be) saved to a file on the computer 120a. Moreover, the receiving device 120b can be programmed to automatically accept the application transfer or to require user input at the receiving device 120b to accept the application transfer.

Figure 2:
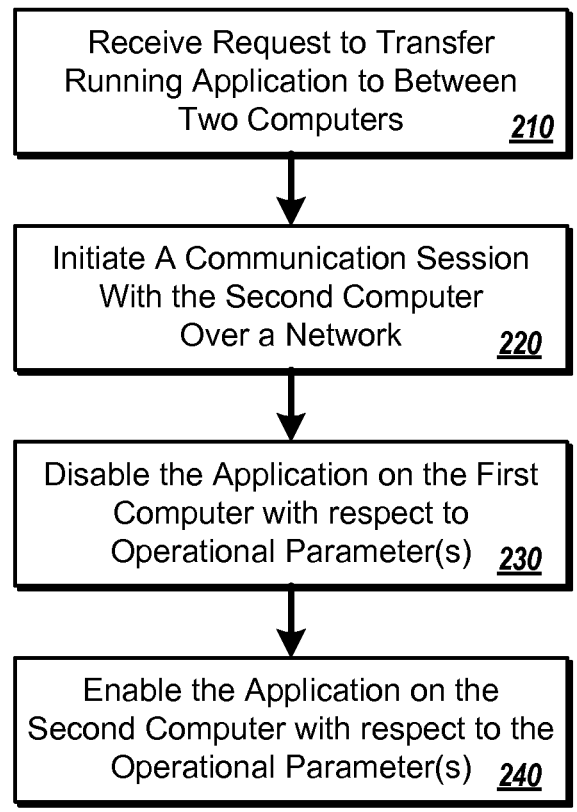
FIG. 2 is a flow chart showing an example of a process to transfer a software application between different computers.

FIG. 2 is a flow chart showing an example of a process 200 to transfer a software application between different computers. A request is received 210. The request corresponds to an application instance running on a first computer (e.g., the application instance 110a on the laptop 120a), and the request is to transfer the application instance 110a to a second computer (e.g., a smart phone 120b). This request can be received and processed by different types of software, firmware and hardware on the first computer. For example, the request can be received by the application instance 110a itself, and the application can perform the processes described herein. Alternatively, the request can be received by a daemon program (or service) that works in conjunction with an operating system on the device 120a, or by a runtime environment program, which is described further below, and the request can be processed either with or without assistance from the application 110.

In any case, a communication session is initiated 220 between the first computer and the second computer over a network (e.g., the network 130 in FIG. 1). This communication session can be initiated using one or more different networking protocols. The communication session can be a secure communication initiated by the first computer to communicate with the second computer, and the application transfer can happen at any time during the initiated communication session, including during a handshake portion of the communication used to establish the session in the first place.

The application can be disabled 230 on the first computer with respect to one or more operational parameters, and the application can be enabled 240 on the second computer with respect to the one or more operational parameters. The one or more operational parameters can include a software licensing state of the application. The disabling 230 can include preventing licensed operation of the application on the first computer (e.g., disabling the license 112a for the application instance 110a on the laptop 120a in FIG. 1). The enabling 240 can include allowing licensed operation of the application on the second computer (e.g., enabling the license 112b for the application instance 110b on the mobile device 120b).

In addition, the one or more operational parameters can include current application data of the application running on the first computer. This application data can include temporary, in-memory data (e.g., current application state information stored in volatile memory) and also one or more files stored in a file system of the first computer (e.g., on hard disk, internal memory, or removable flash drive). The enabling 240 can include transmitting the current application data over the network to the second computer for use in running the application on the second computer (e.g., sending the application data 114*a* from the application instance 110*a* on the laptop 120*a* to be application data 114*b* for the application instance 110*b* on the mobile device 120*b* via the network 130). The disabling 230 can include closing the application running on the first computer (e.g., closing the application instance 110*a* on the laptop 120*a* in FIG. 1 after the application data has been sent to the mobile device 120*b*).

Thus, there can be two distinct processes that are completed to accomplish the application transfer: (1) any licensing requirements for the application can be checked and a license can be transferred between machines; and (2) any application data needed to provide the same, current application session to the user on the new device can also be transferred between the computing machines. The disabling 230 and the enabling 240 can include transfer of the license and application data to the second computer over the network and also notifying the first computer that the license was activated on the second computer so that the first computer can clear its state. The license transfer can involve explicit transferring of license data (e.g., licensing data is copied to the second device and deleted from the first device), or it can involve transferring a license state of active from one license instance to another (e.g., a mere redefinition of state information on the two devices such that the state of the license on the first device is marked as disabled/unlicensed, and the state of the license on the second device is marked as enabled/licensed). In either case, the license transfer can be performed such that the application is never licensed to operate on both devices at one time, and the license transfer can be entirely peer-to-peer, in that no remote server computer need be contacted.

The process flow can involve: (1) transferring the data to the second computer, (2) verifying the transferred data, (3) disabling the license on the first computer, and (4) enabling the license on the second computer. If a failure occurs (e.g., a computer crash or network disconnect) during, before or just after steps (1) or (2), the process can begin over since the first computer already has the license enabled. If a failure occurs after step (3), the second computer will know that it was trying to get the license from first-computer. So, the second computer can contact the first computer, which will notify the second computer that it already has the license marked as disabled at which point the second computer can mark it's license enabled. If a failure occurs after (4), then a restart of the second computer will see the license as enabled and everything is fine. As will be noted, during the transfer, the first computer knows to whom (i.e., the second computer) it is transferring the license, and the second computer knows from whom (i.e., the first computer) it is getting the license. Thus, exceptional cases can be readily handled.

In some implementations, the license can be designed to allow the application to run on multiple devices at one time, which devices are a proper subset of a larger number of devices to which the multi-device license can be transferred. For example, the license can be designed to allow the application 110 to run concurrently on any two of the four devices 120*a*, 120*b*, 120*c*, 120*d* shown in FIG. 1. If the application is transferred to a second computer that already has the license for that application, the application data and in-memory state can be transferred and then a decision can be made regarding the license (e.g., the user can be give a choice) and whether or not to transfer the license from the first to the second computer. If not, the license on the first computer is not disabled. If so, the license on the first computer is disabled, and the second computer is given two licenses (or more if this process is done multiple times). At this point, the second computer can transfer 1-count of the license to a third computer and still keep 1-count of the license with itself. Then the second computer can also transfer it's 1-count of the license to another computer. In this case the peer-to-peer mechanism can be used to manage multiple license counts once they have been given out (e.g., by an originating server), and each individual computer can act as a licensing server itself.

Figure 3:
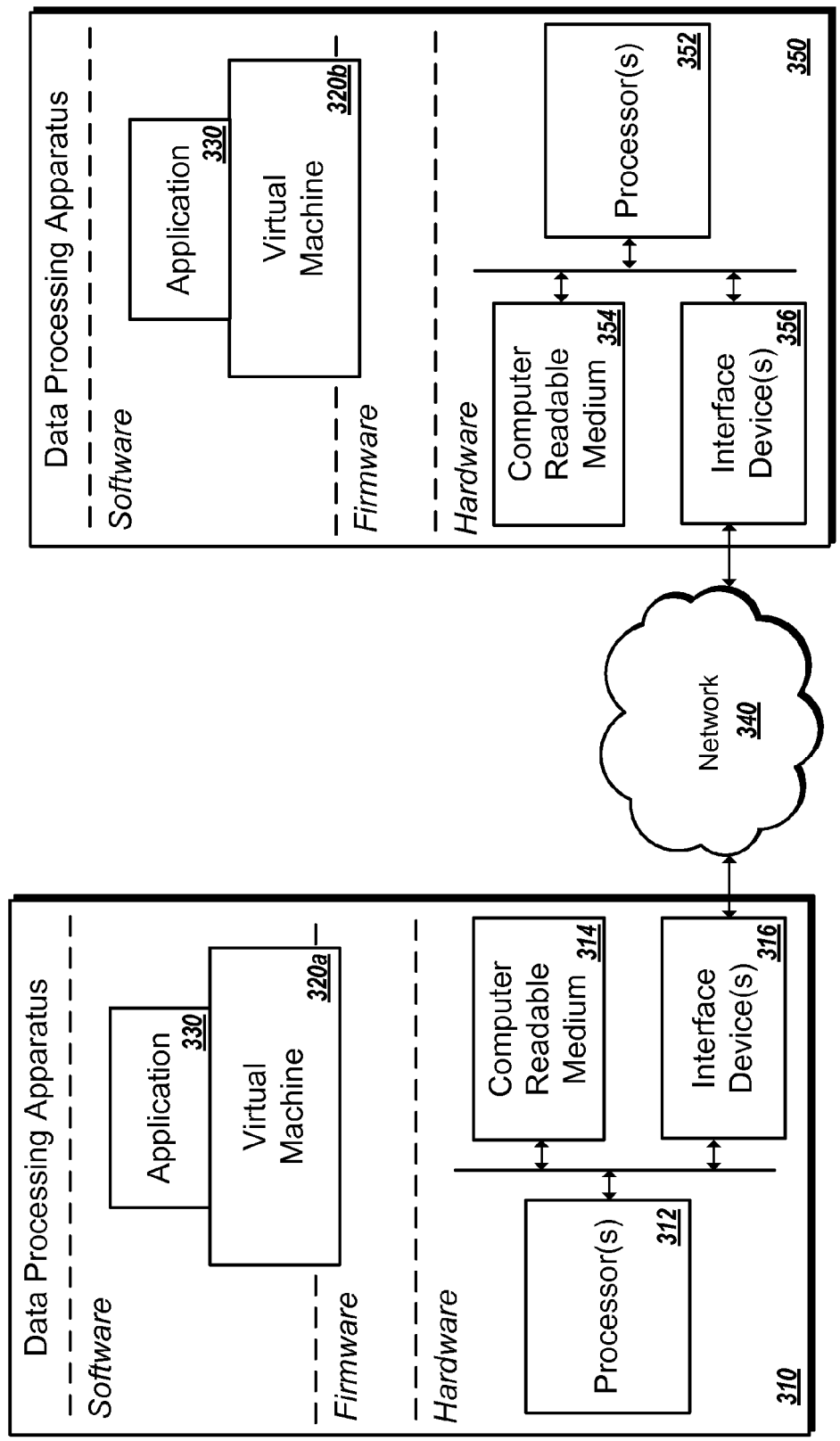
FIG. 3 is block diagram showing another example of a system in which a software application is transferred between different computers.

FIG. 3 is block diagram showing another example of a system in which a software application is transferred between different computers. Data processing apparatus 310, 350 include processors 312, 352 (e.g., one or more single-core or multi-core microprocessors on an integrated circuit device), computer readable media 314, 354 (e.g., a magnetic or optical based recording medium in a disk drive), and interface devices 316, 356. The interface devices 316, 356 include user interface devices (e.g., keyboard and cursor controller mechanism) and network interface devices to communicate using a network 340 (e.g., a wireless network, a wired network, or a combination of these). The data processing apparatus 310, 350 can operate in a fashion such as described above in connection with FIGS. 1 and 2.

In addition, the data processing apparatus 310, 350 include different instances 320*a*, 320*b* of a virtual machine on which an application 330 runs. The code of the application 330 can be identical for the two different apparatus 310, 350, which can be entirely different hardware and operating system platforms, since the code of the application 330 relies on the virtual machine 320 to operate on a given computer. The virtual machine 330 can include a cross-platform application development environment, such as the ADOBE AIR® software provided by Adobe Systems Incorporated of San Jose, Calif. Thus, platform-independent applications can be developed for and readily transferred among multiple different computer platform devices.

In some implementations, each instance of a given application 330 can communicate with the other application instances via a trusted session based on a networking protocol that can be enabled (provided or accessed) by the underlying virtual machine 320. In other implementations, the application 330 itself can implement a secure networking protocol to communicate in a peer-to-peer fashion. Regards of where in the software stack the protocol is implemented, the secure networking protocol can employ features of known networking protocols (e.g., service discovery protocols), such as the BLUETOOTH® protocol or a Zero configuration networking protocol (e.g., the BONJOUR® protocol provided by Apple Computer Inc. of Cupertino, Calif.).

For example, the BLUETOOTH® model can be used, where the user is responsible for pairing devices for a personal area network, where the mobile license can then only be transferred to paired devices; since only trusted devices are typically paired together, the connection is fairly trusted. Thus, the virtual machine 320 can employ a wireless networking protocol to search for available, paired devices, to which a running application can be transferred. The virtual machine 320 can allow individual applications running thereon to broadcast and search for the same application installed on other paired devices. The virtual machine 320 that receives such communications can check if the running application is also available on the receiving device and can install and launch the application, as appropriate, to receiving the running application transfer.

Figure 4:
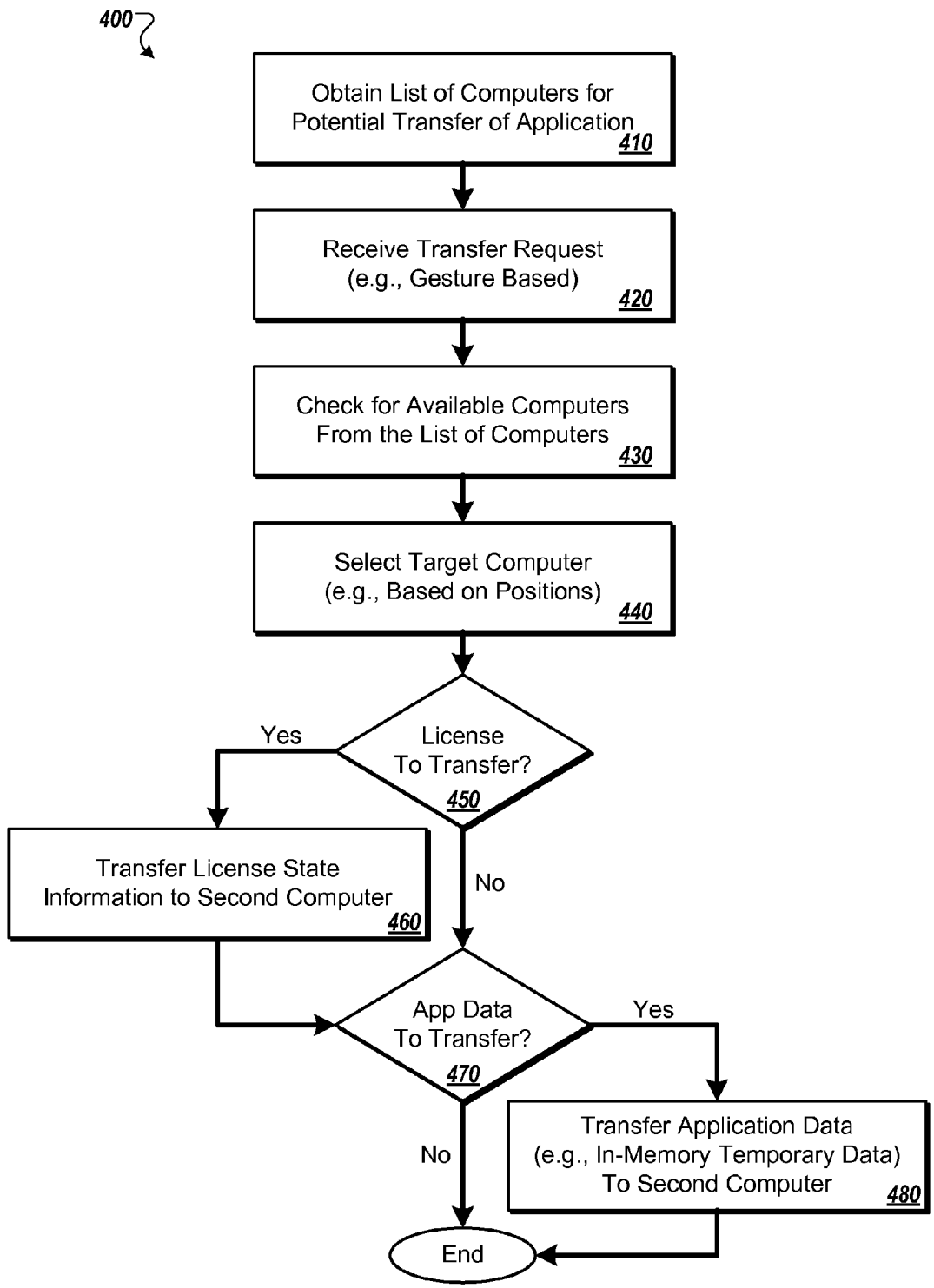
FIG. 4 is another flow chart showing an example of a process to transfer a software application between different computers.

FIG. 4 is another flow chart showing an example of a process 400 to transfer a software application between different computers. A list of computers for potential application transfer is obtained 410. This can be done after an application transfer request is received, or before. The list can be obtained explicitly or implicitly. For example, the list can be obtained implicitly by the pairing of devices, as described above, where devices that are paired for other reason are used as the predetermined list of computers to which an application can be transferred. Also, the list can be obtained implicitly by restrictions defined in a software license for the application (e.g., limits on the types of devices on which the software application is allowed to run).

Alternatively, the list can be obtained explicitly by specifying the particular devices that belong to the list (e.g., by identification of the devices at the time a mobile license is purchased). For example, a computer network (wired and/or wireless) can be searched, and a list of connected computers can be provided so that a user can select which computers to include in the predefined list of potential targets for application transfer. A user interface can also be provided that allows the user to add or remove computers from the predefined list at a later time. In some implementations, a user can maintain multiple lists, e.g. one for office use (i.e., office applications) and another for home use (i.e., personal applications) since different applications can have different computers on which they work. In addition, an application can be associated with a default list or the user can select the list at runtime.

A request to transfer an application is received 420. As noted, this action may precede or succeed the obtaining action 410. Many different types of actions can trigger the application transfer process. The transfer can be automatic or user initiated. For example, in some implementations, the user can press a button on the application instance running on one device, or the user can provide other input to initiate the application transfer. The user input can be based on gestures, such as particular movement(s) of an input element by the user or of a mobile device (e.g., pointing a mobile device at a target device and pressing a button to initiate the application transfer).

The process checks 430 for available computers (e.g., from the predefined list of computers). For example, in implementations based on the BLUETOOTH® model, the first computer can scan for all paired devices currently around. Any target devices found in this scanning can then launch an instance of the application in the course of processing the transfer request.

A second computer is selected 440 from the available computers for the application transfer. For example, a session can be established between various instances of the application on various networked devices, the user can be advised of the available networked devices (e.g., in a user interface list of potential target devices), and the user can select which target device to transfer the application to. Automation can also be employed in selecting which target device of many to transfer the application to. Default rules can be set up to select a target device based on priority information, or other user inputs can be used to infer the desired target device, such as recent text input or gesture inputs.

For example, the selecting 440 can include selecting the second computer based on physical positions of the available computers. These positions can include both physical location information and physical orientation information. Thus, the target computer can be selected based on its physical proximity to the source computer (based on externally provided geo-location information or based on wireless signal strength) and/or based on whether the source computer is somehow pointing to the target computer (based on physical orientation of the device itself or based on orientation of a user input, such as a mouse movement, on the source computer). For example, many mobile devices (e.g., 3G wireless phones) have Global Positioning System (GPS) capabilities and orientation sensors built in to the device. As part of the handshake between the computers, such devices can send their coordinates from the GPS sensor. These coordinates can be used with the orientation data to find which device is where relative to the first computer. For example, some computers will be in front and some back; some will be closer and some farther; etc. Based on this relative positioning, the list of available devices can be sorted and presented it to the user for selection.

With a target computer selected, a check 450 can be made to determine whether transfer of the application to the target computer requires suspension of a license to run the application on the source computer. In some cases, the application may not be governed by a license, but in other cases it will be. If a license is needed to run the application, this license can be a mobile license where multiple computers can run an installed application, but only one (or other proper subset) of these multiple computers can be in the active license state at a given time. An inactive license state cannot be activated for an application on a given device without communication from an active license state version of the application on another device, so the license can be deactivated in one place before being activated in another.

When the selected target computer needs the license from the source computer, licensing state information is transferred 460 from the source computer to the target computer. This can involve simply changing state information on the respective computers (from active to inactive on one computer, and from inactive to active on the other), or this can involve copying and deletion of licensing data between the two computers. In either case, this transfer represents at least a portion of the process of disabling the application on the source computer and at least a portion of the process of enabling the application on the target computer. The details of the license transfer will vary with the licensing technology used. In some cases, a flag is simply set as appropriate, and in other cases, the license data is more complex and can contain details regarding what features of the application are licensed, etc.

With a target computer selected, a check 470 can be made to determine whether the application running on the source computer has in-memory temporary data (and potentially other data such as open application documents with data stored in non-volatile memory storage devices) on the source computer that should be transferred to the target computer. Such local application state/session information (including all user data, such as any clipboard buffer data, cursor location data, undo stack data, etc.) can be sent to the target device to provide a seamless transition of the application from source device to target device. When such data should be transferred, it is transferred 480 from the source computer to the target computer to allow the user to continue working on the same application information with the new device. The application can provide a list of open documents to support the transfer, and all the necessary application data can be packaged together and sent to the target computer, which can unpackage the data, copy the document(s) in the file system and restore the in-memory state. This transfer of application data represents at least a portion of the process of enabling the application on the target computer.

Moreover, it should be noted that the transfer 480 of application data and the transfer 460 of licensing state can both be performed using the same communications session/mechanism. In other embodiments, only one or the other of these transfers is performed. Furthermore, the transfer process from source device to target device can also be reversed, at a later time, to transfer the application back to the source device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving a request, at a first computer, involving a current application session corresponding to an application running on the first computer, to cause operation of the current application session on a second computer; and
   responsive to the receiving of the request to cause operation of the current application session on the second computer:
      causing the current application session on the first computer to be disabled with respect to one or more operational parameters; and
      causing the current application session to be enabled on the second computer with respect to the one or more operational parameters.

2. The method of claim 1, where the one or more operational parameters comprise a software licensing state of the application, the disabling comprises preventing licensed operation of the application on the first computer, and the enabling comprises allowing licensed operation of the application on the second computer.

3. The method of claim 1, where the one or more operational parameters comprise current application data of the application running on the first computer, the disabling comprises closing the application running on the first computer, and the enabling comprises transmitting the current application data over the network to the second computer for use in running the application on the second computer.

4. The method of claim 1, comprising:
   checking for available computers from a predefined list of computers; and
   selecting the second computer from the available computers.

5. The method of claim 4, where the network comprises a wireless network of computers, the checking comprises checking the wireless network of computers, and the selecting comprises selecting the second computer based on physical positions of the available computers.

6. The method of claim 4, where the selecting comprises:
   determining physical positions of the available computers;
   sorting a list of the available computers based on the physical positions of the available computers;
   outputting the sorted list for presentation;
   receiving input; and
   identifying one computer in the list to be the second computer based on the received input.

7. The method of claim 4, where the predefined list of computers comprises a mobile computing device, a cell phone, a laptop computer, and a desktop computer.

8. The method of claim 1, comprising:
   checking whether operation of the application on the second computer requires suspension of a license to run the application on the first computer;
   transferring licensing state information from the first computer to the second computer when operation of the application on the second computer requires suspension of the license to run the application on the first computer, where the transferring the licensing state information comprises at least a portion of the disabling;
   checking whether the application running on the first computer has in-memory temporary data on the first computer; and
   transferring the in-memory temporary data from the first computer to the second computer when the application running on the first computer has the in-memory temporary data on the first computer, where the transferring the in-memory temporary data comprises at least a portion of the enabling.

9. One or more computer storage devices having instructions stored thereon, that when executed by a first computer, cause the first computer to perform operations comprising:
   receiving a request, at the first computer, involving a current application session corresponding to an application running on the first computer, to cause operation of the current application session on a second computer; and
   responsive to the receiving of the request to cause operation of the current application session on the second computer:
      causing the current application session on the first computer to be disabled with respect to one or more operational parameters; and
      causing the current application session to be enabled on the second computer with respect to the one or more operational parameters.

10. The one or more computer storage devices of claim 9, where the one or more operational parameters comprise a software licensing state of the application, the disabling comprises preventing licensed operation of the application on the first computer, and the enabling comprises allowing licensed operation of the application on the second computer.

11. The one or more computer storage devices of claim 9, where the one or more operational parameters comprise current application data of the application running on the first computer, the disabling comprises closing the application running on the first computer, and the enabling comprises transmitting the current application data over the network to the second computer for use in running the application on the second computer.

12. The one or more computer storage devices of claim 9, the operations comprising:
   checking for available computers from a predefined list of computers; and
   selecting the second computer from the available computers.

13. The one or more computer storage devices of claim 12, where the network comprises a wireless network of computers, the checking comprises checking the wireless network of computers for the available computers, and the selecting comprises selecting the second computer based on physical positions of the available computers.

14. The one or more computer storage devices of claim 12, where the selecting comprises:
   determining physical positions of the available computers;
   sorting a list of the available computers based on the physical positions of the available computers;
   outputting the sorted list for presentation;
   receiving input; and
   identifying one computer in the list to be the second computer based on the received input.

15. The one or more computer storage devices of claim 12, where the predefined list of computers comprises a mobile computing device, a cell phone, a laptop computer, and a desktop computer.

16. The one or more computer storage devices of claim 9, the operations comprising:
   checking whether operation of the application on the second computer requires suspension of a license to run the application on the first computer;
   transferring licensing state information from the first computer to the second computer when operation of the application on the second computer requires suspension of the license to run the application on the first computer, where the transferring the licensing state information comprises at least a portion of the disabling;
   checking whether the application running on the first computer has in-memory temporary data on the first computer; and
   transferring the in-memory temporary data from the first computer to the second computer when the application running on the first computer has the in-memory temporary data on the first computer, where the transferring the in-memory temporary data comprises at least a portion of the enabling.

17. A computer comprising:
   one or more processors; and
   one or more computer storage devices having instructions stored thereon that, responsive to execution by the one or more processors, causes the one or more processors to perform operations comprising:
      receiving a request involving a current application session corresponding to an application running on the one or more processors, to cause operation of the current application session on a second computer; and
      responsive to the receiving of the request:
         checking whether operation of the application on the second computer requires suspension of a license to run the application on the one or more processors;
         transferring licensing state information to the second computer when operation of the application on the second computer requires suspension of the license;
         checking whether the current application session has active application data; and
         transferring the active application data from the current application session to the second computer when the current application session has the active application data.

18. The computer of claim 17, the operations comprising:
   checking for available computers from a predefined list of computers; and
   selecting the second computer from the available computers.

19. The computer of claim 18, where the network comprises a wireless network of computers, checking for the available computers comprises checking the wireless network of computers for the available computers.

20. The computer of claim 18, where the selecting comprises selecting the second computer based on physical positions of the available computers.

21. The computer of claim 18, where the selecting comprises:
   determining physical positions of the available computers;
   sorting a list of the available computers based on the physical positions of the available computers;
   outputting the sorted list for presentation;
   receiving input; and
   identifying one computer in the list to be the second computer based on the received input.

22. The computer of claim 17, where the computer and the second computer are each one of a group of computers comprising a mobile computing device, a cell phone, a laptop computer, and a desktop computer.

* * * * *